United States Patent
Aaen

[19]
[11] Patent Number: 6,095,937
[45] Date of Patent: Aug. 1, 2000

[54] TORQUE-RESPONSIVE CLUTCH WITH CONFINED ROLLERS

[75] Inventor: Olav Aaen, Kenosha, Wis.

[73] Assignee: Aaen Performance Parts, Inc., Racine, Wis.

[21] Appl. No.: 09/123,106

[22] Filed: Jul. 27, 1998

[51] Int. Cl.[7] .......................... F16H 55/36; F16H 55/56; F16H 59/00; F16D 23/00
[52] U.S. Cl. .......................... 474/10; 192/54.52; 474/8; 474/19
[58] Field of Search .......................... 474/10, 17, 8, 474/21, 19, 14; 192/54.52, 93; 384/58; 132/317; D15/143, 148, 149

[56] References Cited

U.S. PATENT DOCUMENTS

| | | | |
|---|---|---|---|
| D. 367,023 | 2/1996 | Benson | D12/126 |
| D. 379,999 | 6/1997 | Benson | D15/143 |
| D. 382,283 | 8/1997 | Benson | D15/148 |
| D. 390,855 | 2/1998 | Benson | D15/143 |
| 3,939,720 | 2/1976 | Aaen et al. | 74/230.17 E |
| 4,378,221 | 3/1983 | Huff et al. | 474/19 |
| 4,585,429 | 4/1986 | Marier | 474/12 |
| 5,403,240 | 4/1995 | Smith et al. | 474/8 |
| 5,516,333 | 5/1996 | Benson | 474/19 |
| 5,538,120 | 7/1996 | Berardicurti | 192/54.52 |
| 5,720,681 | 2/1998 | Benson | 470/10 |
| 5,836,320 | 11/1998 | Gueret | 132/317 |

*Primary Examiner*—Mary Ann Battista
*Assistant Examiner*—Marcus Charles
*Attorney, Agent, or Firm*—Jansson, Shupe, Bridge & Munger, Ltd.

[57] ABSTRACT

A torque-responsive clutch has an output shaft and an output pulley mounted with respect to the shaft. The output pulley includes a first sheave fixed with respect to the shaft and a second sheave axially movable with respect to the shaft. A helix is mounted with respect to the shaft. In the improvement, a roller container is mounted for driven engagement with the shaft and such container has an interior surface with a plurality of helix-contacting devices, e.g., rollers, mounted adjacent thereto. The helix extends into the container and contacts the devices. In other aspects of the improved clutch, the roller container and the second sheave define a chamber and the helix-contacting devices are confined in such chamber.

17 Claims, 8 Drawing Sheets

TORQUE-RESPONSIVE CLUTCH WITH CONFINED ROLLERS

FIELD OF THE INVENTION

This invention relates generally to endless belt power transmission systems and, more particularly, to such systems having an expansible cone pulley.

BACKGROUND OF THE INVENTION

Vehicles use a wide variety of transmissions for vehicle propulsion. Common types include manually shifted, multi-stage geared transmissions and automatic transmissions using internal power-operated (electrically or hydraulically) clutches, usually with a torque converter.

Another type of transmission which finds wide use in smaller vehicles, e.g., snowmobiles, all-terrain vehicles (ATVs) and small haulage and towing vehicles is an endless belt transmission, often referred to as a continuously variable transmission (CVT) since both output torque and speed vary substantially continuously, i.e., without gear shifts, over the entire speed range of the engine. A CVT is disclosed in U.S. Pat. No. 4,585,429 (Marier).

Since the operation of endless belt power transmission systems of the CVT type is by no means intuitive, it will be helpful to provide a detailed explanation of such systems before describing the invention even though such invention relates only to the system output pulley and the mechanism related thereto.

A CVT has two pulleys, namely, a flyweight pulley driven by the engine and an output pulley used to power an output shaft. An endless belt engages both pulleys.

A CVT transmission uses changing effective pulley diameters to change the torque available at the output shaft and the driven speed of such output shaft. Very high torque (at low rotational speed) is available as the vehicle moves from standstill while modest torque at high rotational speed is used for high speed propulsion.

Power transmission systems of this type automatically and continuously adjust torque and speed to provide a more-or-less constant horsepower drive system. (It will be recalled that horsepower is the product of torque, speed and some constant, the latter being a function of the units of measure of torque. The equation is $HP = T \times S \times K$.)

Considered in more detail, in a power transmission system of the CVT type, a flyweight pulley is directly coupled to and powered by the engine. The flyweight pulley has two disc-like pulley sheaves mounted in opposed relationship. Together, the sheaves form a pulley.

The flyweight pulley is constructed in such a way that the first sheave is axially fixed (as well as rotationally fixed) with respect to the engine drive shaft. The second sheave is axially movable with respect to the first. As the second sheave moves with respect to the first, the effective diameter of the flyweight pulley changes.

An endless belt engages the engine flyweight pulley and also engages an output pulley, the driven shaft of which powers the vehicle. The output pulley, of the type often referred to as a split pulley, also has an axially-fixed first sheave and a second sheave axially movable with respect to the first. In this type of transmission, horsepower is transmitted from the flyweight pulley to the output pulley because the sheaves apply pressure to the side edges of the belt. That is, the bottom surface of the belt does not contact the "root" of the pulley.

As engine speed increases somewhat above idle speed, the resulting modest centrifugal force overcomes spring force and the second sheave of the flyweight pulley moves toward the first sheave, thereby engaging the belt to move the vehicle from standstill to some low speed. At this low engine speed, the belt is engaged but, notably, the effective diameter of the flyweight pulley, which is then relatively small, does not change.

As engine speed is further increased, the resulting more aggressive centrifugal force overcomes a higher spring force in the output pulley and the second sheave moves further toward the first sheave, thereby increasing the effective diameter of the flyweight pulley. Since the belt is of fixed length, the effective diameter of the output pulley must necessarily decrease. This reduces the torque and increases the speed available at the output shaft driven by the output pulley.

From the foregoing, it is apparent that at vehicle startup, relatively high torque (at low speed) must transfer from the flyweight pulley through the belt to the output pulley and thence to the output drive shaft powering the snow-engaging belt (in a snowmobile) or the wheels of an ATV, to cite but two examples.

To transfer such torque, the movable sheave of the output pulley must be urged toward the fixed sheave to apply sufficient force to the edges of the belt to prevent belt slippage or at least prevent significant belt slippage. And, ideally, the amount of force applied to the belt by the output pulley (by movement of the movable sheave) should be generally proportional to the torque being transmitted. The objectives are to (a) provide enough pulley-engaging force to transmit torque, and (b) avoid using excessive force which can significantly reduce belt life and introduce unwanted inefficiency into the transmission system.

Some time ago, a mechanism known as a torque-responsive clutch was developed to meet this need in a CVT. Components of such a clutch include the sheaves of the output pulley and examples of such clutches are disclosed in U.S. Pat. Nos. 3,939,720 (Aaen et al.); 4,378,221 (Huff); 5,403,240 (Smith); 5,516,333 (Benson); 5,720,681 (Benson) and others.

A typical torque-responsive clutch has what is known as a helix, an example of which is shown in U.S. Pat. No. Des. 382,283 (Benson). Helix-contacting devices, plastic "buttons" or rollers, bear against the helix and urge the second sheave toward the belt. An example of a roller-type helix-contacting device is shown in U.S. Pat. No. Des. 367,023 (Benson).

Known torque-responsive clutches mount the helix-contacting devices in what might be termed an open operating environment as depicted in the Benson '023, '333 and '681 patents. Other embodiments mount such devices on the outside of a cylindrical can-like component sometimes referred to as a bearing carrier.

A disadvantage of such arrangements arises from the fact that the rotational speed of the torque-responsive clutch can be very high, i.e., on the order of several thousand revolutions per minute. Consequently, the centrifugal force is also high and breakage of the helix-contacting device can send shrapnel-like fragments flying away from the clutch and toward the vehicle operator or toward other operating components of the vehicle. Personal injury and/or mechanical damage may result.

Another disadvantage is that, since the helix-contacting device is on the outside of the bearing carrier, centrifugal force imposes tension on the device support pin. A crack or fracture could result.

Yet another disadvantage of helix-contacting devices of the non-rotating plastic button type is that the button riding on the helix surface creates significant friction and, therefore, inefficiency. And the friction is not constant. The static friction between the helix and the plastic button (that friction existing when there is no relative movement between the helix and the button) is higher than the dynamic friction, i.e., that friction existing when there is relative movement between the helix and the button. In an aggravated case, such difference in friction may be noticeable during operation of the vehicle.

A torque-responsive clutch which addresses disadvantages of known clutches would be an important advance in the art.

OBJECTS OF THE INVENTION

It is an object of the invention to provide an improved torque-responsive clutch which addresses certain disadvantages of the prior art.

Another object of the invention is to provide an improved torque-responsive clutch which helps contain fragments of a broken helix-contacting device.

Another object of the invention is to provide an improved torque-responsive clutch which helps prevent such fragments from striking the operator of a vehicle upon which the clutch is mounted.

Still another object of the invention is to provide an improved torque-responsive clutch which helps prevent such fragments from striking other operating components of the vehicle.

Still another object of the invention is to provide an improved torque-responsive clutch which dramatically diminishes stress forces imposed on pins supporting helix-contacting devices.

Another object of the invention is to provide an improved torque-responsive clutch which minimizes friction between the helix-contacting device and the helix. How these and other objects are accomplished will become apparent from the following detailed descriptions and from the drawings.

SUMMARY OF THE INVENTION

The invention is an improvement in a torque-responsive clutch of the type having an output shaft which rotates about a shaft axis. An output pulley is mounted with respect to the shaft and includes a first sheave axially and rotationally fixed with respect to the shaft. The pulley also has a second sheave axially movable with respect to the shaft and the clutch also includes a helix mounted with respect to the shaft.

In the improvement, a hollow, cylindrical "can-like" roller container is mounted for driven engagement with the shaft. The container has an interior surface with a plurality of helix-contacting devices mounted adjacent thereto. The helix extends into the container and contacts the devices.

In another aspect of the invention, the container interior surface has a first radius. The helix includes a plurality of generally triangular fingers, each having a radially outward surface at a second radius slightly less than the first radius. In that way, the container and the helix are cooperatively sized so that the fingers may extend into, rather than around the outside of, the container. In a more specific embodiment, the outward surfaces of the fingers have a radius of curvature equal to the second radius.

Considering the helix-contacting devices, a preferred device includes a roller rotatably mounted on a support pin fixed to the container. Most preferably, the roller is a roller bearing having a metal face contacting the helix. In another, somewhat less preferred embodiment, the roller is a plastic roller or a roller made of composite material contacting the helix. The plurality is comprised of three rollers spaced 120° apart. Each of the roller support pins extends along a pin axis which intersects the shaft axis, preferably at 90°.

In another aspect of the invention, the can-like roller container has a circular lip or edge toward the first sheave. The second sheave has a circular hub away from the first sheave, i.e., facing toward the container. In a preferred embodiment, the edge and the hub are in close proximity to one another and thereby form an enclosed chamber defined by the container and the second sheave. The plurality of helix-contacting devices are confined in the chamber. In that way, pieces from a broken device are much less likely to be thrown outwardly away from the clutch and strike a person or other components of the vehicle. And in the specific arrangement of the new clutch, at least the helix fingers are in the chamber and contact the devices within such chamber.

Further details of the invention are set forth in the drawings and in the following detailed description.

BRIEF DESCRIPTIONS OF THE DRAWINGS

DESCRIPTION OF PRIOR ART

Figure 3:
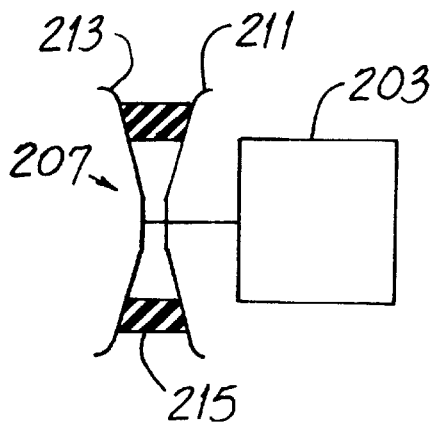
FIG. 3 is a representative elevation view, partly in section, of the vehicle engine and the flyweight pulley mounted thereon and operating at intermediate engine speed.

Before setting out details of the invention, it will be helpful to have an understanding of how an endless belt power transmission system operates. Referring to FIGS. 1 through 6, an engine-powered vehicle 201, a snowmobile for example, includes an engine 203 having a shaft 205 upon which is mounted a flyweight pulley 207 of a known type. The vehicle 201 also has an output pulley 209 mounted thereon to rotate an output shaft 217 driving the propulsion track. Both pulleys 207, 209 are constructed in such a way that their effective diameters may change.

The flyweight pulley 207 includes a first sheave 211 fixed with respect to and rotating with the engine shaft 205; that is, the sheave 211 does not move, either axially or rotationally, with respect to the shaft 205. A second sheave 213 is mounted to move axially with respect to the shaft 205 and to the first sheave 211 and a flexible, endless V-belt 215 is in the pulley 207.

Figure 2:
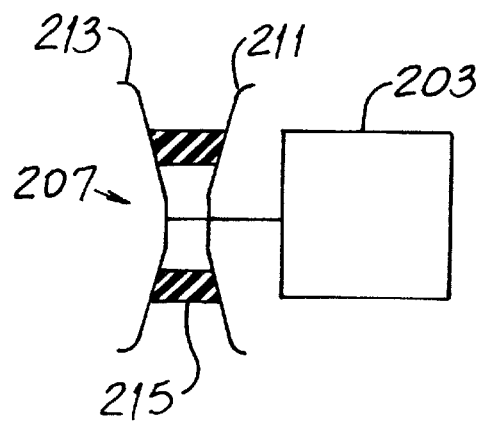
FIG. 2 is a representative elevation view, partly in section, of the vehicle engine and the flyweight pulley mounted thereon and operating at low engine speed.
Figure 1:
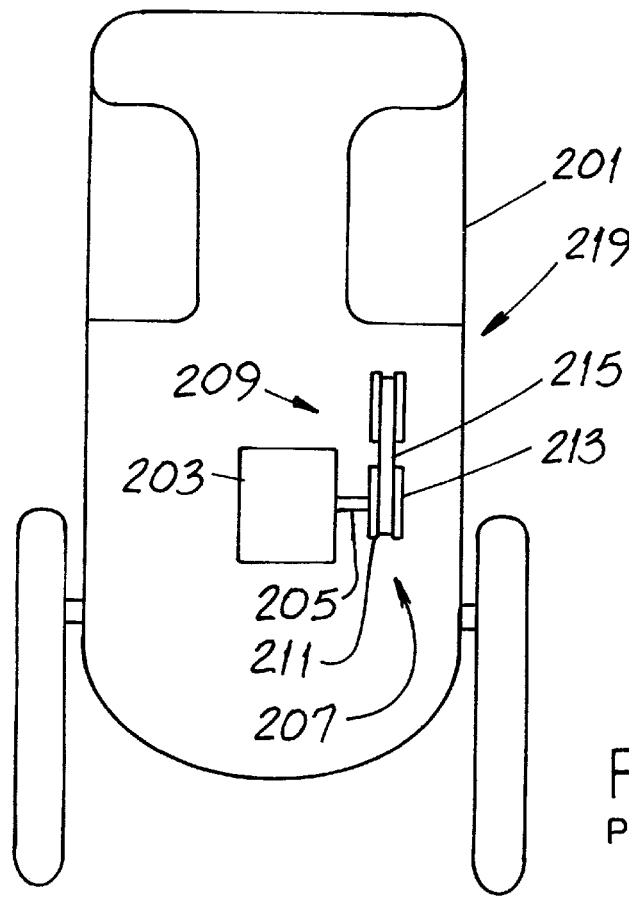
FIG. 1 is a representative top plan view of an exemplary land vehicle, a snowmobile, with which the new clutch may be used.

As engine speed increases somewhat above idle speed, modest centrifugal force overcomes spring force and the second sheave 213 of the flyweight pulley 207 moves toward the first sheave 211, thereby engaging the belt 215 (as shown in FIG. 2) to move the vehicle 201 from standstill to some low speed. At this low engine speed, the belt 215 is engaged but, notably, the effective diameter of the flyweight pulley 207, which is then relatively small, does not change.

As engine speed is further increased, the resulting more aggressive centrifugal force overcomes a higher spring force in the flyweight pulley 207 and the second sheave 213 moves closer to the first sheave 211, thereby increasing the effective diameter of the flyweight pulley 207 as indicated in FIG. 3. Simultaneously, the effective diameter of the output pulley 209 decreases.

Figure 4:
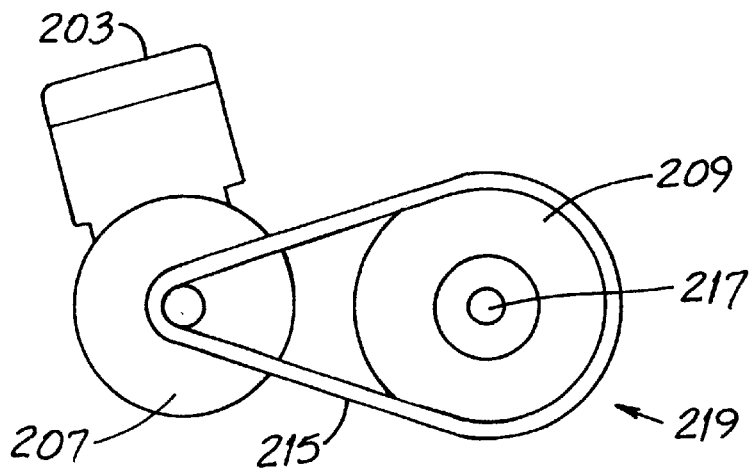
FIGS. 4, 5 and 6 are representative side elevation views of a power transmission system showing the effective diameter relationships of the flyweight pulley and the output pulley at low, intermediate and high engine speeds, respectively.
Figure 5:
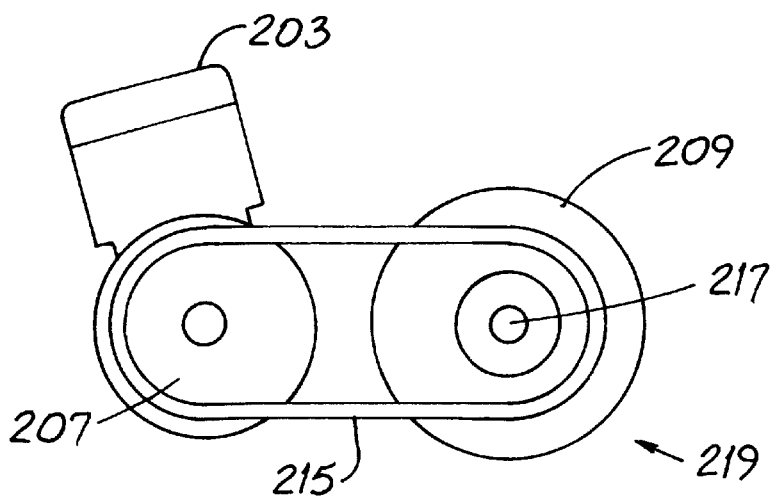
Figure 6:
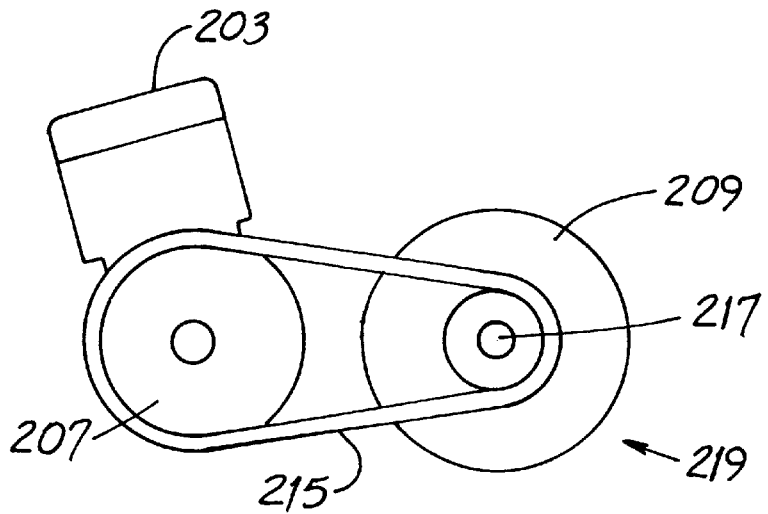

The changes in such effective pulley diameters are apparent from comparing the transition from FIG. 4 to FIG. 5 to FIG. 6. FIG. 4 shows the effective diameters of the flyweight pulley 207 and output pulley 209 at very low vehicle speed, FIG. 5 shows such diameters an intermediate speed and FIG. 6 shows such diameters at maximum vehicle speed.

The following will give some idea of how changing the effective diameters of the flyweight and output pulleys 207, 209 changes the torque/speed characteristic of the power transmission system 219. Considering FIG. 4, the torque available at the output shaft is about three times that available at the engine shaft 205 but the speed of such output shaft 217 will be about 33% of that at the engine shaft 205. In other words, the system 219 then provides torque multiplication and speed division.

When the pulleys 207, 209, have approximately equal effective diameters as represented by FIG. 5, the torque and speed of the output shaft 217 will closely match the torque and speed of the engine shaft 205. And when the effective diameter of the flyweight pulley 207 is greater than that of the output pulley 209 as shown in FIG. 6, the torque available at the output shaft 217 will be somewhat less than that available at the engine shaft 205 but the speed of the output shaft 217 will be somewhat greater than that of the engine shaft 205. In a practical system 219 operating as shown in FIG. 6, the torque ratio is about 1:0.75 and the speed ratio is about 0.75:1. This might properly be termed an overdrive system.

DETAILED DESCRIPTIONS OF PREFERRED EMBODIMENTS OF THE INVENTION

Referring also to FIGS. 7 through 12, the output pulley 209 is part of a torque-responsive clutch 10 having an output shaft 11 which rotates about a shaft axis 13. The clutch 10 includes a first output sheave 15 rotationally and axially fixed with respect to the clutch shaft 11. The second output sheave 17 is axially movable with respect to the shaft 11. At the portion 19 of the shaft 11 at which the sheave 17 is mounted, the shaft 11 is smooth and the sheave 17 is supported thereon by a sleeve bearing fixed to the sheave 17. Each sheave 15, 17 includes a smooth, annular face 21, slightly angled as shown FIG. 7. The faces 21 bear against the side edges of the belt 215 and permit the clutch 10 to receive power transferred (via the belt 215) from the flyweight pulley 207 to the output pulley 209 and, in turn, to power the output shaft 11. In a particular embodiment, the output shaft 11 is hollow and has internal splines 23 to receive a splined shaft extension. (Splines are but one way of torsionally joining shafts. Keyed shafts may also be used.)

Figure 7:
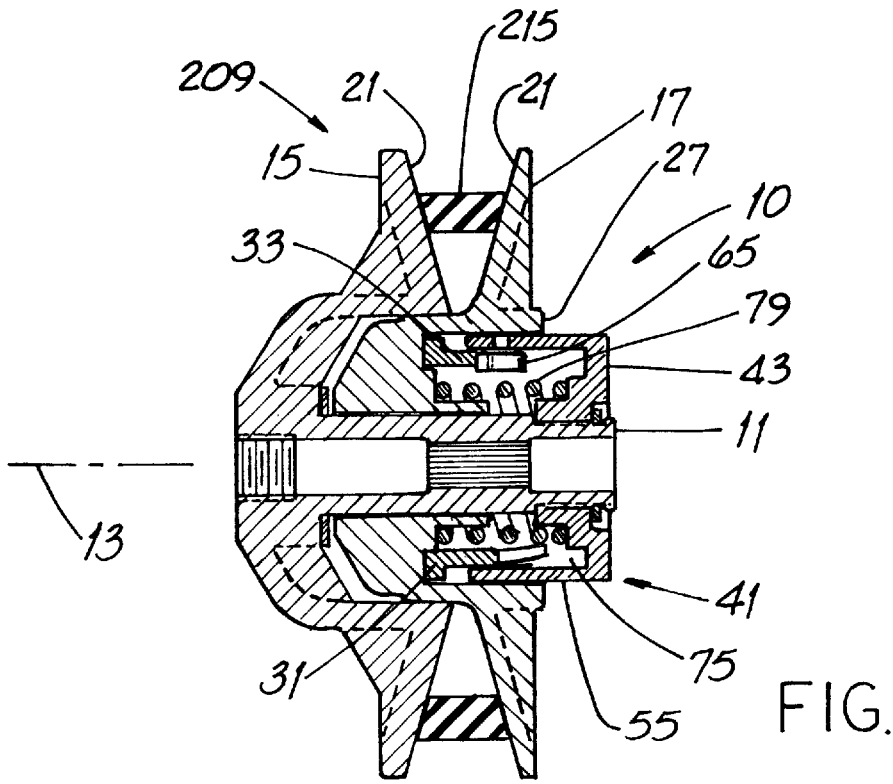
FIG. 7 is a section view of the new torque-responsive clutch which may constitute a part of the transmission system shown in FIGS. 4, 5 and 6.
Figure 12:
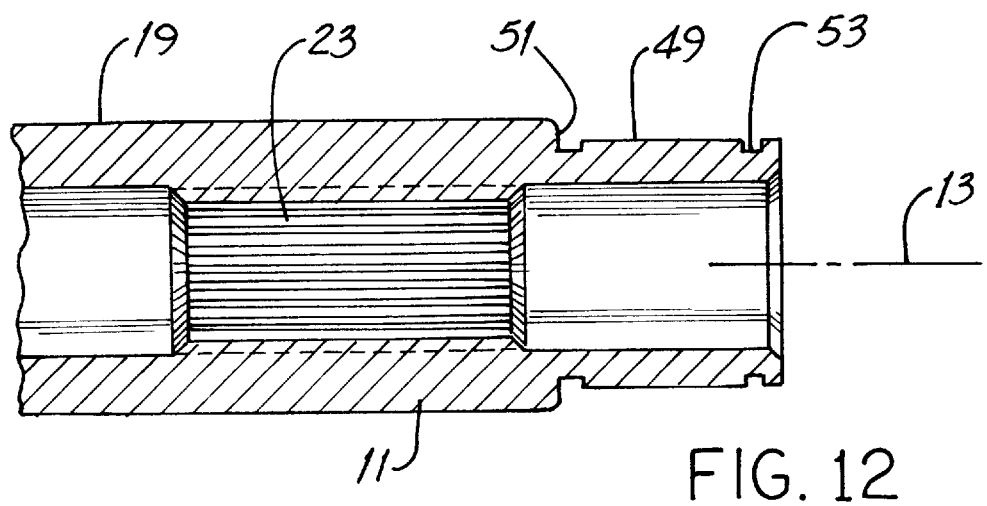
FIG. 12 is an enlarged section view of the output shaft shown in the clutch of FIG. 7. Parts are broken away.
Figure 8:
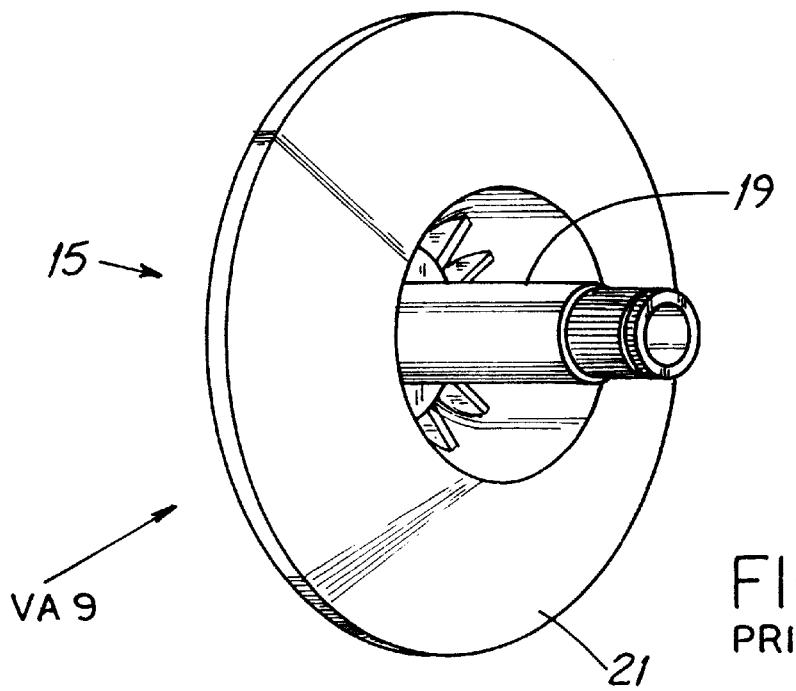
FIG. 8 is a perspective view of the first sheave used in the clutch of FIG. 7.
Figure 9:
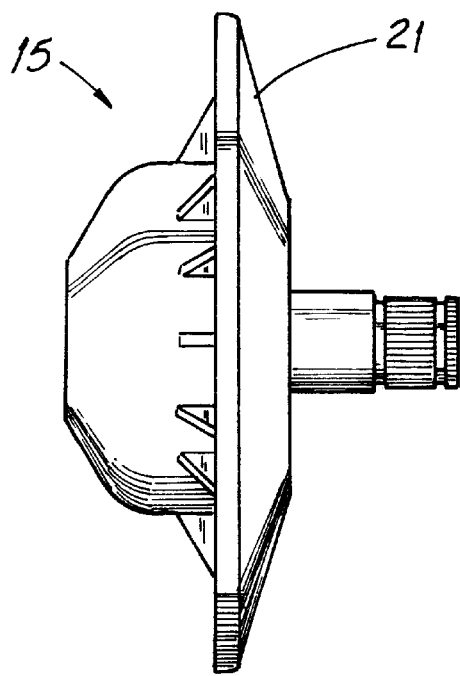
FIG. 9 is a side elevation view of the sheave of FIG. 8 taken along the viewing axis VA9 thereof.
Figure 10:
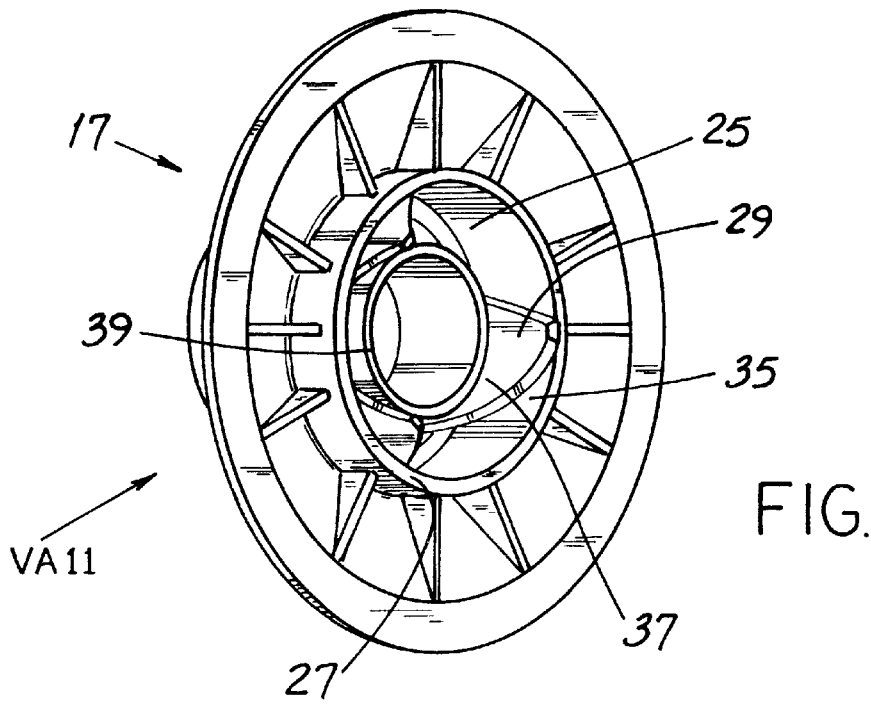
FIG. 10 is a perspective view of the second sheave used in the clutch of FIG. 7.
Figure 11:
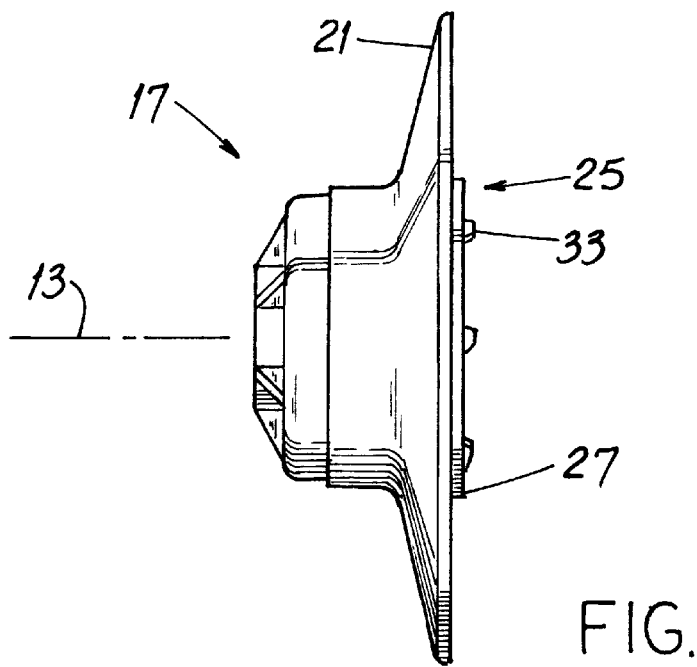
FIG. 11 is a side elevation view of the sheave of FIG. 10 taken along the viewing axis VA11 thereof.
Figure 13:
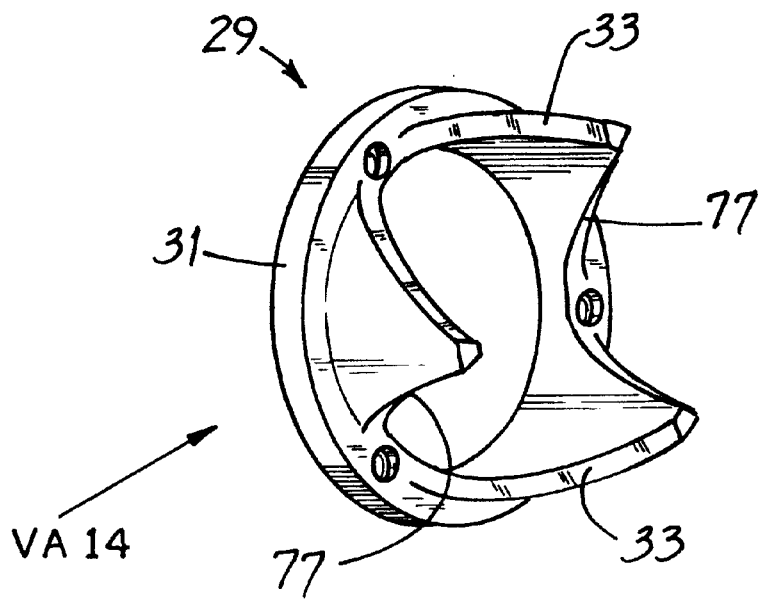
FIG. 13 is a perspective view of the helix used in the clutch of FIG. 7.
Figure 14:
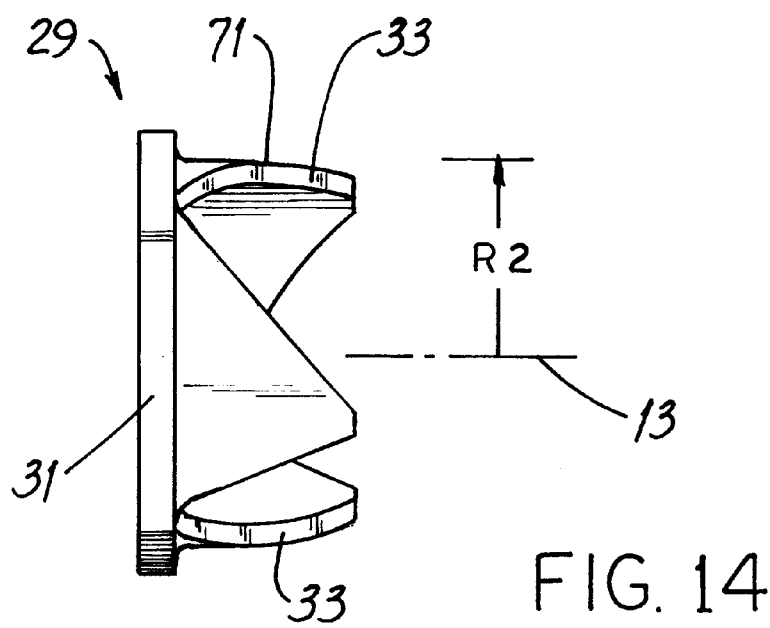
FIG. 14 is a side elevation view of the helix of FIG. 13 taken along the viewing axis VA14 thereof.
Figure 15:
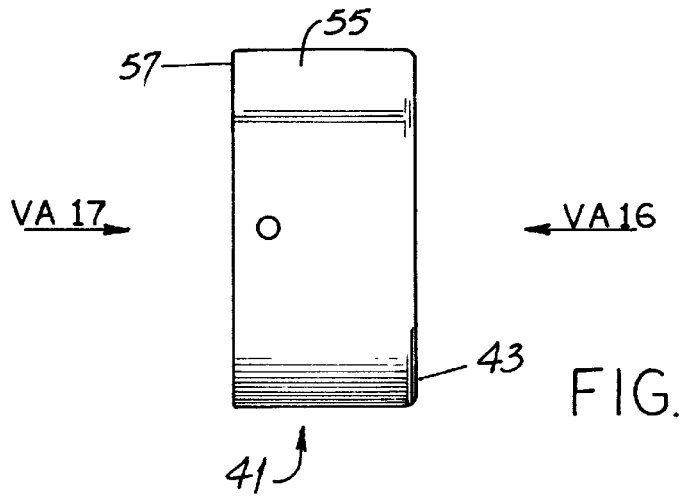
FIG. 15 is a side elevation view of the roller container used in the clutch of FIG. 7.
Figure 16:
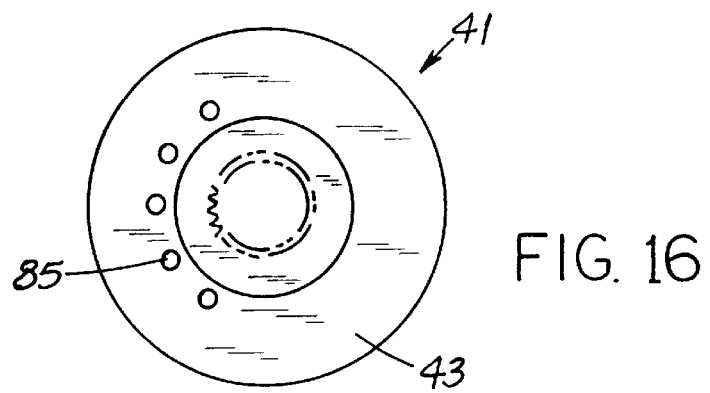
FIG. 16 is an elevation view of the roller container of FIG. 15 taken along the viewing axis VA16 thereof. Certain surfaces are shown in dashed outline.
Figure 17:
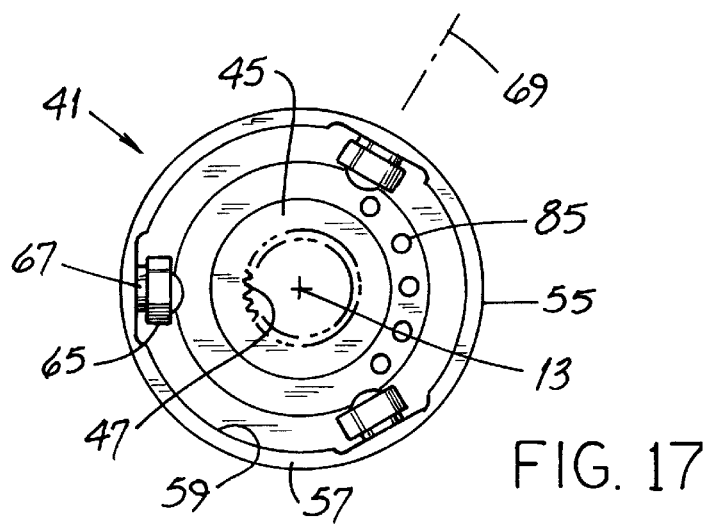
FIG. 17 is an elevation view of the roller container of FIG. 15 taken along the viewing axis VA17 thereof. Certain surfaces are shown in dashed outline.
Figure 18:
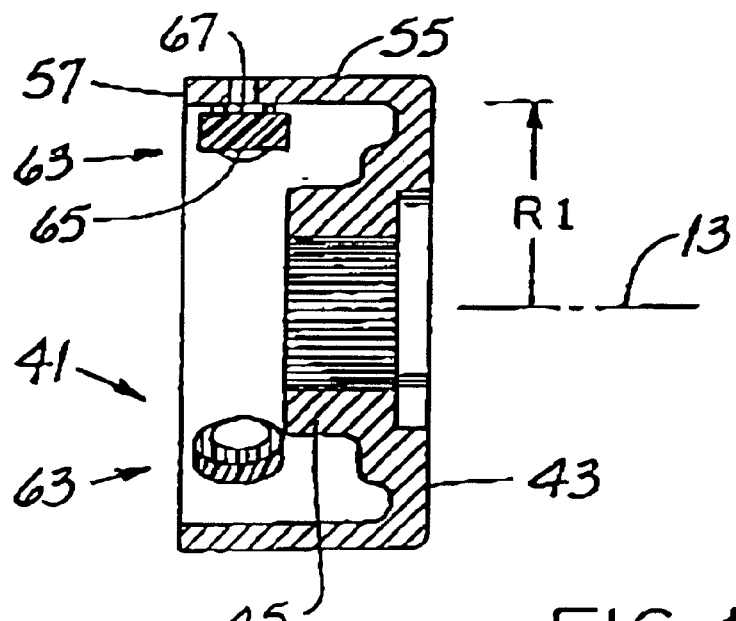
FIG. 18 is a section view of the roller container of FIGS. 15, 16 and 17. Certain parts are shown in full representation.
Figure 19:
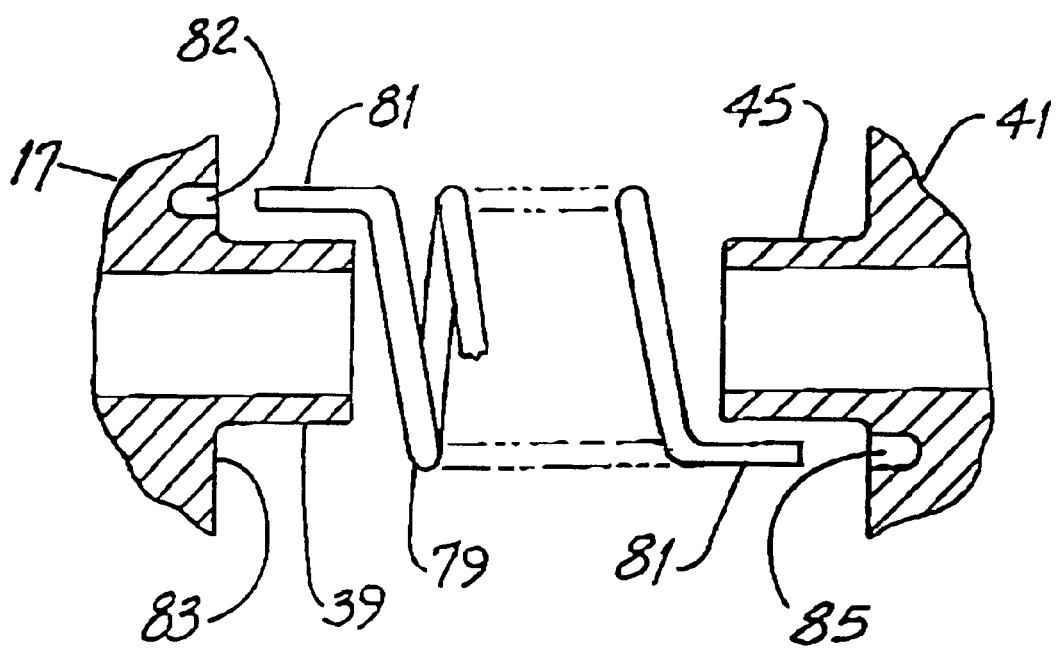
FIG. 19 is an elevation view, partly in section, showing an alternate embodiment of components of the clutch of FIG. 7.

Referring particularly to FIGS. 7, 10 and 11, the second sheave 17 includes a pocket 25 surrounded and delimited by the sheave hub 27. Referring also to FIGS. 13 and 14, a helix 29 includes a support ring 31 and three helix fingers 33 rigidly attached thereto and extending therefrom. The fingers 33 are substantially equidistant from the shaft axis.

The helix support ring 31 surrounds the shaft 11 and is affixed to the bottom wall of the pocket 25 by fasteners or the like. There is an annular outer clearance 35 between the hub 27 and the fingers 33 and an annular inner clearance 37 between the fingers 33 and the central boss 39 through which the shaft 11 extends. The manner in which such clearances are used is described below.

Referring also to FIGS. 15, 16, 17 and 18, the clutch 10 includes a roller container 41 which is generally cylindrical and has an end panel 43 with a hub 45 protruding axially therefrom. The hub 45 has internal splines 47 to engage the splined outward end 49 of the shaft 11. Axial position retention of the container 41 with respect to the shaft 11 is by a shaft shoulder 51 bearing against the hub 45 and by a snap ring lodged in the ring groove 53 cut in the splined end 49.

The container 41 has a cylindrical wall 55 extending axially from the end panel 43, integrally formed therewith (that is, the preferred container 41 is of one-piece construction) and terminated by an annular edge 57 toward the first sheave 15. The interior surface 59 of the wall 55 is generally cylindrical, is formed at a first radius R1 (with respect to the axis 13) and has a plurality of helix-contacting devices 63 mounted adjacent to such surface 59.

A preferred device 63 includes a roller 65 rotatably mounted on a support pin 67 fixed to the container wall 55. The roller 65 may be embodied as a roller bearing having a metal face or as a needle roller cam follower. In another, somewhat less preferred embodiment, the roller 65 is a plastic roller or is made of composite material. In a specific embodiment, the plurality of devices 63 includes three rollers 65 spaced 120° apart. Each of the roller support pins 67 extends along a pin axis 69 which intersects the shaft axis 13, preferably at 90°.

Referring particularly to FIGS. 13 and 14, each of the generally triangular fingers 33 of the helix 29 has a radially outward surface 71 at a second radius R2 slightly less than the first radius R1. Ideally, the outward surfaces of the fingers have, when viewed axially, a radius of curvature equal to the second radius R2. In that way, the container 41 and the helix 29 are cooperatively sized so that the fingers 33 may extend into, rather than around the outside of, the container 41. This relationship is shown in FIG. 7.

Referring now to FIGS. 1, 7, 10–12 and 15–17, the second sheave 17 has its hub 27 away from the first sheave 15, i.e., facing toward the container 41. In a preferred embodiment, the edge 57 and the hub 27 are in close proximity to one another and thereby form an enclosed chamber 75 defined by the container 41 and the second sheave 17. And the wall 55 of the container 41 is aligned with the clearance 35 between the hub 27 and the fingers 33 so that the wall 55 is received in such clearance 35.

The plurality of helix-contacting devices 63 are confined in the chamber 75 and at least the helix fingers 33 are in the chamber 75 and contact the devices 63 within such chamber 75. By mounting the devices 63 within the substantially enclosed chamber 75, pieces from a broken device 63 are much less likely to be thrown outwardly away from the clutch 10 and strike a person or other components of the vehicle 201. And tension stress on the device support pins 67 is eliminated or at least substantially reduced. This is so because the devices 63 are urged toward the interior surface of the container 41 rather than exerting a "stretching" force on the pins 67. And for good containment of pieces from a broken device 63, the container 41 is constructed with a sturdy wall 55.

From the foregoing, it will be observed that by virtue of the smooth shaft portion 19 and the sheave-supporting sleeve bearing, the second sheave 17 is incapable of being driven or otherwise being acted upon (except for support) by the shaft 11. The splined end 49 of the shaft 11 drives the roller container 41 through the container internal splines 47.

Because of the angled ramp-like surfaces 77 on the helix fingers 33 and because the devices 63 mounted on the container 41 contact such surfaces 77, driving rotation of the container 41 functions to urge the second sheave 17 toward the belt 215, i.e., away from the container 41. And the greater the torque applied to the container 41, the more forcefully is the sheave 17 forced against the belt 215. In a sense, the clutch 10 automatically responds to torque output by providing a force against the belt 215 generally proportional to such output.

Referring now to FIGS. 7, 16, 17 and 19, in a preferred embodiment, a coiled compression spring 79 is between the container 41 and the second sheave 17 to "preload" the sheave 17 against the belt 215. The outside diameters of the hubs 45 and boss 39, and the inside diameter of the spring 79 are cooperatively sized so that the hub 45 and boss 39 function as a spring guide and retain the spring 79 in position.

While an operable embodiment results from using a spring 79 which applies only axial force to the sheave 17, a highly preferred embodiment uses a coiled compression spring which has axially protruding tangs 81, one at each end. One of the tangs 81 is received in one of the apertures 82 formed in the bottom wall 83 of pocket 25 of the second sheave 17. The other tang 81 is received in one of the apertures 85 formed in the container 41. After both tangs 81 are inserted in their respective apertures 82, 85, the second sheave 17 is rotated until the container 41 and its devices 63 can be urged toward the sheave 15 and over the protruding helix fingers 33. As the devices 63 move along the fingers 33, the spring 79 is twisted to provide preload. Varying levels of preload can be obtained, depending upon which of the apertures 85 is used. In that way, the spring 79 urges the second sheave 17 to a location at which the fingers 33 contact the respective devices 63, even when the clutch 10 is at standstill. Although the main reason to preload spring 79 is to provide side force against the belt 215, preloading also helps eliminate jolts and possibly-damaging shock force to the rollers 65 and pins 67.

As used herein, the term "vehicle" means a land vehicle powered by an internal combustion engine.

While the principles of the invention have been shown and described in connection with preferred embodiments, it is to be understood clearly that such embodiments are by way of example and are not limiting.

What is claimed:

1. In a torque-responsive clutch having an output shaft and an output pulley mounted with respect to the shaft, the output pulley including a first sheave fixed with respect to the shaft and a second sheave axially movable with respect to the shaft, and wherein the clutch further includes a helix having at least one finger member, the helix mounted with respect to the shaft, the improvement wherein:

a roller container is mounted for driven engagement with the shaft, the roller container having a substantially closed end surface;

the container has an interior surface with a plurality of helix-contacting devices mounted adjacent thereto;

the helix extends into the container and contacts the devices; and the finger members and the helix-contacting devices are enclosed in the container.

2. The clutch of claim 1 wherein:

each device includes a roller rotatably mounted on a support pin.

3. The clutch of claim 2 wherein the roller is a roller bearing having a metal face contacting the helix.

4. The clutch of claim 2 wherein the roller is a plastic roller contacting the helix.

5. The clutch of claim 2 wherein the roller is a needle roller cam follower contacting the helix.

6. The clutch of claim 2 wherein the roller is made of composite material.

7. The clutch of claim 1 wherein:

the interior surface has a first radius;

the helix includes a plurality of fingers, each having an outward surface at a second radius less than the first radius.

8. The clutch of claim 7 wherein the outward surfaces of the fingers are curved and have a radius of curvature equal to the second radius.

9. In a torque-responsive clutch with an output shaft and an output pulley mounted with respect to the shaft, the output pulley including a first sheave fixed with respect to the shaft and a second sheave axially movable with respect to the shaft, and wherein the clutch further includes a helix having at least one finger member, the helix mounted with respect to the shaft, the improvement wherein:

a roller container is mounted for driven engagement with the shaft, the roller container having a substantially closed end surface;

the container has an edge toward the first sheave;

the second sheave has a hub away from the first sheave;

the edge and the hub are in close proximity to one another, thereby forming a chamber defined by the container and the second sheave; and the finger members and a plurality of helix-contacting devices are enclosed in the chamber.

10. The clutch of claim 8 wherein:

the helix is in a chamber and contacts the devices.

11. The clutch of claim 10 wherein:

the container has an interior surface; and the plurality of helix-contacting devices is mounted adjacent to the interior surface.

12. The clutch of claim 11 wherein:

each helix-contacting device includes a roller rotatably mounted on a support pin.

13. The clutch of claim 12 wherein the roller is a roller bearing having a metal face contacting the helix.

14. The clutch of claim 12 wherein the roller is a plastic roller contacting the helix.

15. The clutch of claim 12 wherein:

the shaft rotates about a shaft axis; and each support pin extends along a pin axis which intersects the shaft axis.

16. The clutch of claim 1 wherein the roller container includes a substantially uninterrupted side surface.

17. The clutch of claim 9 wherein the roller container includes a substantially uninterrupted side surface.

* * * * *